United States Patent
Argue et al.

(10) Patent No.: US 9,043,225 B2
(45) Date of Patent: May 26, 2015

(54) APPROXIMATING ALTERNATE CURRENCY EQUIVALENTS IN DIGITAL RECEIPTS

(71) Applicant: Wal-Mart Stores, Inc., Bentonville, AR (US)

(72) Inventors: Stuart Argue, Palo Alto, CA (US); Anthony Emile Marcar, San Francisco, CA (US)

(73) Assignee: WAL-MART STORES, INC., Bentonville, AR (US)

( * ) Notice: Subject to any disclaimer, the term of this patent is extended or adjusted under 35 U.S.C. 154(b) by 41 days.

(21) Appl. No.: 13/691,614

(22) Filed: Nov. 30, 2012

(65) Prior Publication Data

US 2014/0156432 A1 Jun. 5, 2014

(51) Int. Cl.
G06G 1/12 (2006.01)
G06Q 20/00 (2012.01)
G06Q 40/04 (2012.01)

(52) U.S. Cl.
CPC .................................. *G06Q 40/04* (2013.01)

(58) Field of Classification Search
None
See application file for complete search history.

(56) References Cited

U.S. PATENT DOCUMENTS

| | | | |
|---|---|---|---|
| 4,766,293 A | 8/1988 | Boston | |
| 4,926,368 A | 5/1990 | Morita | |
| 5,920,847 A | 7/1999 | Kolling | |
| 6,390,366 B1 | 5/2002 | Heidenreich | |
| 6,988,078 B1 | 1/2006 | Heidenreich | |
| 7,328,188 B1 | 2/2008 | Barry | |
| 7,588,180 B1 | 9/2009 | Carmichael | |
| 7,953,634 B2 | 5/2011 | Cleary | |
| 8,364,584 B2 | 1/2013 | Nicholls | |
| 8,554,598 B2 | 10/2013 | Pool | |
| 8,666,860 B2 | 3/2014 | Golding | |
| 2001/0011241 A1* | 8/2001 | Nemzow | 705/35 |
| 2006/0200410 A1* | 9/2006 | Kelley et al. | 705/43 |
| 2008/0040248 A1* | 2/2008 | Im | 705/35 |
| 2009/0177579 A1 | 7/2009 | Ling | |
| 2011/0016007 A1* | 1/2011 | Shiftan et al. | 705/16 |
| 2012/0036063 A1 | 2/2012 | Sivapathasundram | |
| 2013/0085905 A1* | 4/2013 | Menon et al. | 705/30 |

FOREIGN PATENT DOCUMENTS

| | | |
|---|---|---|
| EP | 1579356 A2 | 9/2005 |
| WO | WO0219275 A1 | 3/2002 |
| WO | WO0241111 A3 | 1/2003 |
| WO | WO03067535 A1 | 8/2003 |

* cited by examiner

*Primary Examiner* — Paul Danneman
(74) *Attorney, Agent, or Firm* — Howard & Howard Attorneys PLLC

(57) ABSTRACT

The present invention extends to methods, systems, and computer program products for approximating alternate currency equivalents in digital receipts. In response to a user request, item prices in one currency in a digital receipts (e.g., for retail sales transactions) can be approximated in a second different currency. Digital receipts with approximated item prices can be presented on a display at a mobile device. Currency conversion can be handled at a receipt data server or at the mobile device. Currency conversion can be performed locally or can be referred to a conversion server. Item prices in digital receipts can be converted from and/or to any of a variety of different currencies.

20 Claims, 8 Drawing Sheets

**Digital Receipt 801
(US Dollars)**

| Item | Units | Department | Price |
|---|---|---|---|
| Coffee | 1 lb | Grocery | $6.85 |
| T Soup | 1 | Grocery | $1.79 |
| Apples | 1.2 | Grocery | $2.50 |
| Oil | 3 | Automotive | $5.10 |
| Shoes | 1 pr | Men's Wear | $55.00 |
| Wrench | 1 lb | Automotive | $6.50 |
| | | Sub-Total | $77.74 |
| | | Tax (6.25%) | $4.86 |
| | | Total | $82.60 |

**Digital Receipt 802
(Japanese Yen)**

| Item | Units | Department | Price (Approximated) |
|---|---|---|---|
| Coffee | 1 lb | Grocery | ¥557.11 |
| T Soup | 1 | Grocery | ¥145.58 |
| Apples | 1.2 | Grocery | ¥203.33 |
| Oil | 3 | Automotive | ¥414.78 |
| Shoes | 1 pr | Men's Wear | ¥4,473.15 |
| Wrench | 1 lb | Automotive | ¥528.65 |
| | | Sub-Total | ¥6,322.59 |
| | | Tax (6.25%) | ¥395.86 |
| | | Total | ¥6,717.86 |

Exchange Rate 821

1 US Dollar = 81.33 Japanese Yen

*Fig. 8*

APPROXIMATING ALTERNATE CURRENCY EQUIVALENTS IN DIGITAL RECEIPTS

BACKGROUND

1. Field of the Invention

This invention relates generally to the field of electronic sales transactions, and, more particularly, to approximating alternate currency equivalents in digital receipts.

2. Related Art

In a variety of transactions, consumers or buyers of goods or services typically receive receipts from their respective merchants or service providers as proof of existence of conducted transactions. Generally, receipts are issued by merchants and service providers for a number of reasons including, for example, regulatory or tax reasons and convenience purposes. A receipt provides information about a corresponding transaction for the purpose of providing all participants with a trace or record of the transaction. Receipts can later be used by a consumer for various purposes including, for example, proving participation in a transaction for tax reporting purpose, product returns, use as a claim ticket for a further transaction, provisioning warranties, etc. For in-store purchases, consumers generally obtain a paper receipt at the point-of-sale. Accordingly, consumers frequently retain paper receipts for some amount of time after a transaction. Saved paper receipts can then be used by consumers later to return merchandise, to track expenses for budgeting purposes, or to substantiate tax, reimbursement, or warranty claims, among many other uses.

In many situations, it may be desirable to obtain a version of a receipt that indicates purchase prices and totals in a currency other than a local currency used by a merchant. For example, if a purchase is made in a country that uses a currency other than a customer's native currency, the customer may have limited, if any, understanding of the actual costs indicated on a receipt. If a currency is relatively new (e.g., recently adopted in one or more countries, such as, the Euro) this can be especially problematic.

Alternately, even if a customer is familiar with a particular currency, other persons associated with a transaction may desire to view the receipt. These other persons may not be familiar the particular currency. Many households include family members that leave abroad in different countries but that rely on pooled or common financial resources for support. For example, a household can include family members living in multiple different countries that each uses a different currency. Thus, if a family member makes a purchase in a country that uses one currency, other family members in a country that uses another different currency may not be able to easily determine actual costs. However, the family member managing the pooled or common financial resources may need to know the actual costs.

BRIEF DESCRIPTION OF THE DRAWINGS

The specific features, aspects and advantages of the present invention will become better understood with regard to the following description and accompanying drawings where:

FIG. 8 illustrates approximating an alternate currency equivalent in a digital receipt.

DETAILED DESCRIPTION

Figure 1:
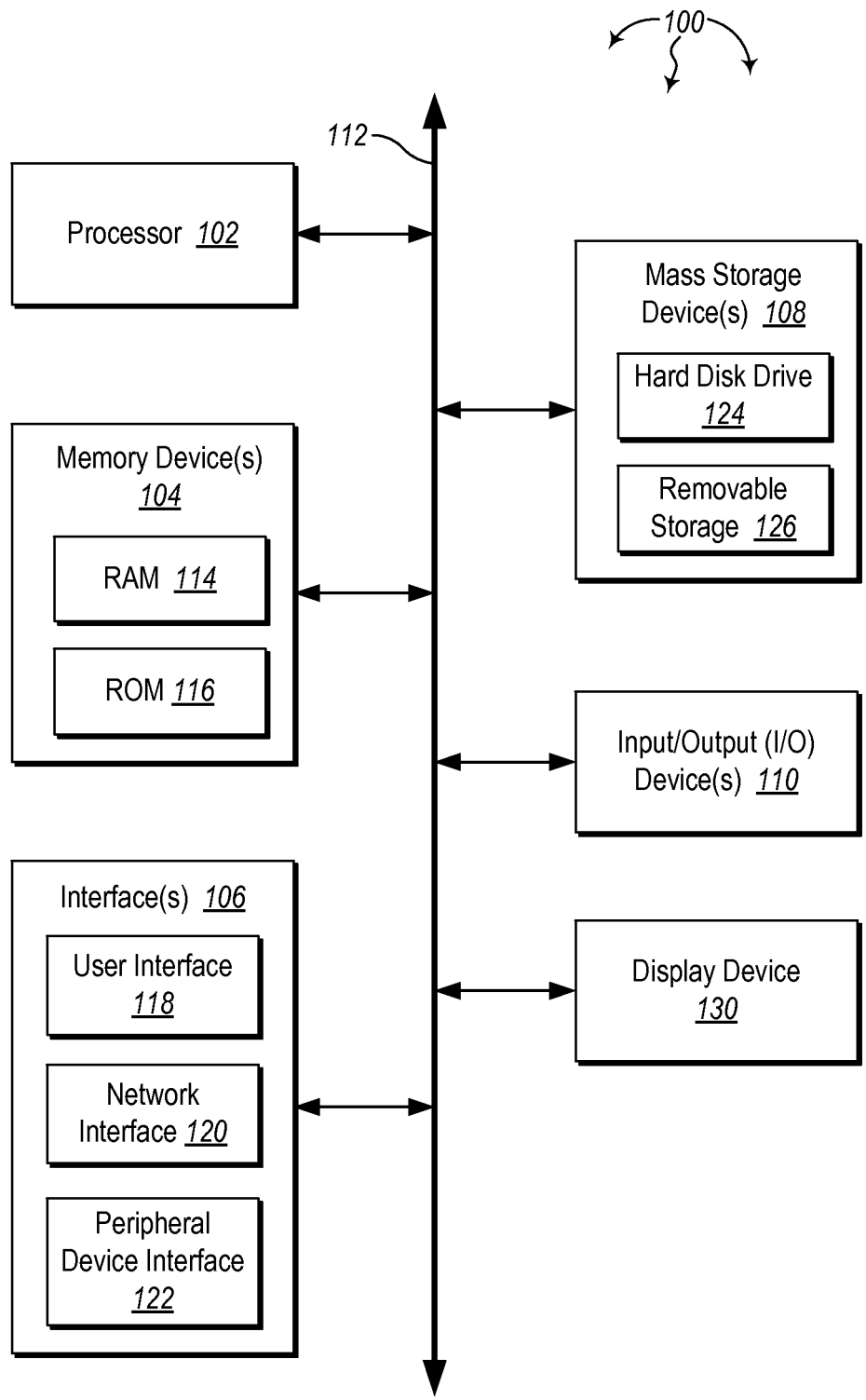
FIG. 1 illustrates an example block diagram of a computing device.

The present invention extends to methods, systems, and computer program products for approximating alternate currency equivalents in digital receipts. For example, financial data, such as, individual item prices, grouped item prices, sales tax, subtotals, totals, refunds, coupon values, discounts, etc., can be indicated in a digital receipt using a local currency (e.g., a currency used where a customer made a purchase). Embodiments of the invention facilitate approximating the financial data, such as, individual item prices, grouped item prices, sales tax, subtotals, totals, refunds, coupon values, discounts, etc., within the digital receipt in a second different currency (e.g., another currency that is more familiar to a customer).

In the following description of the present invention, reference is made to the accompanying drawings, which form a part hereof, and in which is shown by way of illustration specific embodiments in which the invention is may be practiced. It is understood that other embodiments may be utilized and structural changes may be made without departing from the scope of the present invention.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are computer storage media (devices). Computer-readable media that carry computer-executable instructions are transmission media. Thus, by way of example, and not limitation, embodiments of the invention can comprise at least two distinctly different kinds of computer-readable media: computer storage media (devices) and transmission media.

Computer storage media (devices) includes RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (devices) (or vice versa). For example, computer-executable instructions or data structures received over a network or data link can be buffered in RAM within a network interface module (e.g., a "NIC"), and then eventually transferred to computer system RAM and/or to less volatile computer storage media (devices) at a computer system. RAM can also include solid state drives (SSDs or PCIx based real time memory tiered Storage, such as FusionIO). Thus, it should be understood that computer storage media (devices) can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, various storage devices, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Embodiments of the invention can also be implemented in cloud computing environments. In this description and the following claims, "cloud computing" is defined as a model for enabling ubiquitous, convenient, on-demand network access to a shared pool of configurable computing resources (e.g., networks, servers, storage, applications, and services) that can be rapidly provisioned via virtualization and released with minimal management effort or service provider interaction, and then scaled accordingly. A cloud model can be composed of various characteristics (e.g., on-demand self-service, broad network access, resource pooling, rapid elasticity, measured service, etc.), service models (e.g., Software as a Service (SaaS), Platform as a Service (PaaS), Infrastructure as a Service (IaaS), and deployment models (e.g., private cloud, community cloud, public cloud, hybrid cloud, etc.). Databases and servers described with respect to the present invention can be included in a cloud model.

Further, where appropriate, functions described herein can be performed in one or more of: hardware, software, firmware, digital components, or analog components. For example, one or more application specific integrated circuits (ASICs) can be programmed to carry out one or more of the systems and procedures described herein. Certain terms are used throughout the following description and Claims to refer to particular system components. As one skilled in the art will appreciate, components may be referred to by different names. This document does not intend to distinguish between components that differ in name, but not function.

In this description and in the following claims, an "application ID" is defined as an identifier used to match a mobile device to a sales transaction. An application ID can be a receipt ID, an account ID, a session ID, a user name, an application specific ID, an ID from a device keychain, any other token as well as a combination of one of more of these. In some embodiments, a receipt ID for a digital receipt is contained in a QR code in a corresponding paper receipt. A mobile device can scan the QR code to obtain the receipt ID. The mobile device can then use the receipt ID to request the digital receipt from a receipt data server.

In general, embodiments of the invention are directed to approximating alternate currency equivalents in digital receipts. A point-of-sale ("POS") system generates digital receipt data as part of a sales transaction for a customer. The point-of-sale ("POS") system transfers an application identifier for the customer's mobile device along digital receipt data for the sales transaction to a receipt data server. The receipt data server formulates a digital receipt from the digital receipt data. The digital receipt indicates financial data, such as, for example, individual item prices, grouped item prices, sales tax, subtotals, totals, refunds, coupon values, discounts, etc., in a first currency. The receipt data server stores the application identifier along with the digital receipt.

Subsequently, the customer (or another user) can use the mobile device to request digital receipts from the receipt data server. The mobile device can request that financial data in returned digital receipts be indicated in the first currency. Alternately, the mobile device can request financial data in returned digital receipts be indicated a second different currency. In some embodiments, a second different currency is specified at the time digital receipts are requested. In other embodiments, a second different currency is stored in configuration settings, for example, at the mobile device and/or at the receipt data server. The configuration settings can be referred to when a request for digital receipts is received.

When a request is for financial data to be indicated in a second different currency, the receipt data server can handle approximating financial data in the second different currency based on the financial data in the first currency. In some embodiments, the receipt data server has a local conversion module that can be used to convert financial data from the first currency to the second different currency. The receipt data server then returns the digital receipts, with financial data indicated in the second different currency, to the mobile device. The receipt data server can also store the digital receipts, with financial data indicated in the second different currency, for later access.

In other embodiments, the receipt data server sends digital receipts, with financial data indicated in the first currency, to a currency conversion server for approximation. The currency conversion server converts financial data from the first currency to the second different currency. The currency conversion server returns digital receipts, with financial data indicated in the second currency, to the receipt data server. The receipt data server receives the digital receipts, with financial data indicated in the second currency, from the conversion server.

The receipt data server can then send the digital receipts, with financial data indicated in the second currency, to the mobile device. The receipt data server can also store the digital receipts, with financial data indicated in the second currency, for later access. In some embodiments, the currency conversion server returns digital receipts, with financial data indicated in the second currency, directly to the mobile device. The mobile device can receive digital receipts, with financial data indicated in the second currency, and present digital receipts, with financial data indicated in the second currency, for viewing by a user.

In further embodiments, the receipt data server refers to a currency rate server to obtain an exchange rate between the first currency and the second different currency. The receipt data server can then use the exchange rate to convert financial data from the first currency to the second different currency.

In some embodiments, a mobile device requests digital receipts, with financial data indicated in a first currency, and then the mobile device handles approximating the financial data in the second different currency. For example, a mobile device can send digital receipts, with financial data indicated in a first currency, to a currency conversion server for conversion. The currency conversion server converts the financial data from the first currency to the second different currency. The currency conversion server returns digital receipts, with financial data indicated in the second currency, to the mobile device. The mobile device can receive digital receipts, with financial data indicated in the second currency, and present digital receipts, with financial data indicated in the second currency, for viewing by a user.

In other embodiments, the mobile device has a currency conversion module that can be used to convert financial data from a first currency to a second different currency. The mobile device can receive digital receipts, with financial data indicated in the first currency, (e.g., from a data receipt server), convert the financial data from the first currency to the second different currency, and present digital receipts, with financial data indicated in the second currency, for viewing by a user.

In additional embodiments, the mobile device refers to a currency rate server to obtain an exchange rate between the first currency and the second different currency. The mobile device can then use the exchange rate to convert financial data from the first currency to the second different currency.

In general, approximating financial data in a second currency is based on currency exchange rates between a first currency and the second currency at the time a transaction is conducted. In some embodiments, financial data is approximated into a second different currency relatively close in time to when a transaction is conducted. In these embodiments, currency exchange rates close to the time the transaction is conducted can be used.

In other embodiments, approximating financial data in a second currency is requested sometime after a digital receipt is generated. In these other embodiments, historical currency exchange rates can be stored for later use. When financial data approximation is requested, reference can be made to the stored currency exchange rates and a currency exchange rate close in time to a transaction can be used. Currency exchange rates can be stored at specified intervals (e.g., once day).

Approximating financial data in one currency from the same financial data indicated in another currency can include converting some or all of the financial data in a digital receipt. For example, approximating financial data can include converting individual item prices, grouped item prices, sub-totals, totals, sales tax, coupon values, discounts, refunds, etc. Currency conversion can also include converting from and/or to currency symbols and/or currency codes used to denote a currency type, such, for example, $ or USD (United States Dollar), € or EUR (Euro Member Countries Euro), £ or GBP (United Kingdom Pound), pyσ or RUB (Russia Ruble), ¥ or CNY (China Yuan Renminbi), ¥ or JPY (Japan Yen), $ or MXN (Mexico Peso), etc.

FIG. 1 illustrates an example block diagram of a computing device 100. Computing device 100 can be used to perform various procedures, such as those discussed herein. Computing device 100 can function as a server, a client, or any other computing entity. Computing device 100 can perform various communication and data transfer functions as described herein and can execute one or more application programs, such as the application programs described herein. Computing device 100 can be any of a wide variety of computing devices, such as a mobile telephone or other mobile device, a desktop computer, a notebook computer, a server computer, a handheld computer, tablet computer and the like.

Computing device 100 includes one or more processor(s) 102, one or more memory device(s) 104, one or more interface(s) 106, one or more mass storage device(s) 108, one or more Input/Output (I/O) device(s) 110, and a display device 130 all of which are coupled to a bus 112. Processor(s) 102 include one or more processors or controllers that execute instructions stored in memory device(s) 104 and/or mass storage device(s) 108. Processor(s) 102 may also include various types of computer storage media, such as cache memory.

Memory device(s) 104 include various computer storage media, such as volatile memory (e.g., random access memory (RAM) 114) and/or nonvolatile memory (e.g., read-only memory (ROM) 116). Memory device(s) 104 may also include rewritable ROM, such as Flash memory.

Mass storage device(s) 108 include various computer storage media, such as magnetic tapes, magnetic disks, optical disks, solid state memory (e.g., Flash memory), and so forth. As depicted in FIG. 1, a particular mass storage device is a hard disk drive 124. Various drives may also be included in mass storage device(s) 108 to enable reading from and/or writing to the various computer readable media. Mass storage device(s) 108 include removable media 126 and/or non-removable media.

I/O device(s) 110 include various devices that allow data and/or other information to be input to or retrieved from computing device 100. Example I/O device(s) 110 include cursor control devices, keyboards, keypads, barcode scanners, microphones, monitors or other display devices, speakers, printers, network interface cards, modems, cameras, lenses, CCDs or other image capture devices, and the like.

Display device 130 includes any type of device capable of displaying information to one or more users of computing device 100. Examples of display device 130 include a monitor, display terminal, video projection device, and the like.

Interface(s) 106 include various interfaces that allow computing device 100 to interact with other systems, devices, or computing environments as well as humans. Example interface(s) 106 can include any number of different network interfaces 120, such as interfaces to personal area networks (PANs), local area networks (LANs), wide area networks (WANs), wireless networks (e.g., near field communication (NFC), Bluetooth, Wi-Fi, etc, networks), and the Internet. Other interfaces include user interface 118 and peripheral device interface 122.

Bus 112 allows processor(s) 102, memory device(s) 104, interface(s) 106, mass storage device(s) 108, and I/O device(s) 110 to communicate with one another, as well as other devices or components coupled to bus 112. Bus 112 represents one or more of several types of bus structures, such as a system bus, PCI bus, IEEE 1394 bus, USB bus, and so forth.

Figure 2:
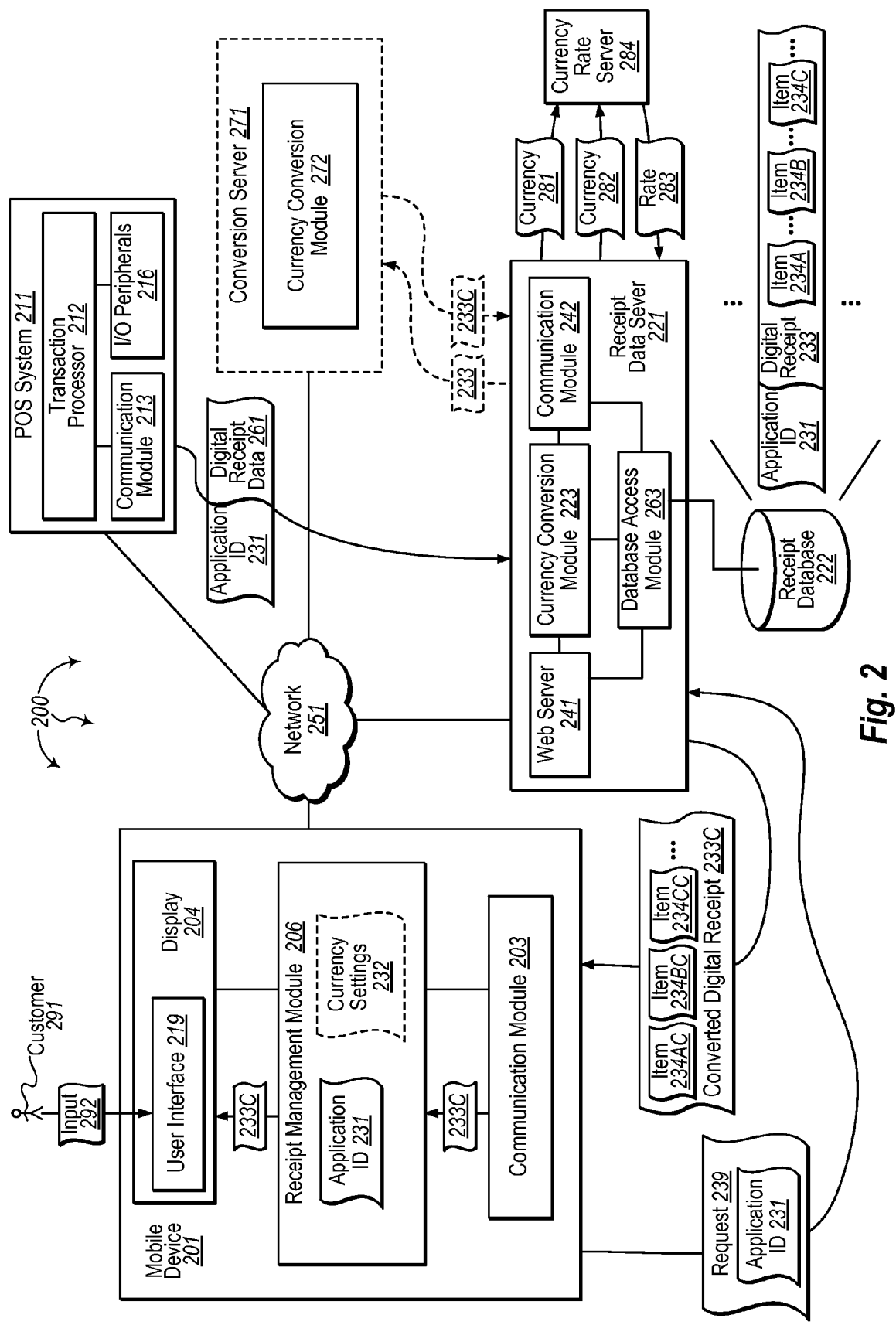
FIG. 2 illustrates an example computer architecture that facilitates approximating alternate currency equivalents in digital receipts.

FIG. 2 illustrates an example computer architecture 200 that facilitates approximating alternate currency equivalents in digital receipts. Referring to FIG. 2, computer architecture 200 includes mobile device 201, POS system 211, receipt data server 221, conversion server 271, and currency rate server 284. Each of the depicted systems, servers, and devices as well as their respective components can be connected to one another over (or be part of) network 251, such as, for example, a PAN, a LAN, a WAN, and even the Internet. Accordingly, each of the depicted components as well as any other connected computer systems and their components, can create message related data and exchange message related data (e.g., near field communication (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

POS system 211 includes transaction processor 212, communication module 213, and I/O peripherals 216. POS system 211 can be physically located at a checkout lane in a store. Generally, transaction processor 212 is configured to manage sales transactions for POS 211. Transaction processor 212 can receive input from I/O peripherals 216 to open a sales transaction, collect receipt data (e.g., date, time, item, number of units, item prices, receipt (sub-)totals, tax, department, etc.) for a sales transaction, and close a sales transaction. Receipt data for an item (e.g. item description, item price, department, etc.) can be retrieved from an item database in response to scanning a barcode on (or otherwise identifying) the item. Other receipt data for an item (e.g., number of units, tax, etc.) can be calculated by transaction processor 212. I/O peripherals 216 can include one or more of: a monitor (e.g., a cashier-facing monitor), one or more input devices (e.g., scanners, keyboards, scales, or the like), one or more payment devices (e.g., cash drawers, card readers, etc.) for receiving or returning payments, and one or more output devices (e.g., customer-facing display or monitor, receipt printer, etc.).

Communication module 213 can be a wired and/or wireless network adapter for connecting POS system 211 with a network, such as, for example, a Wi-Fi and/or wired Ethernet network, that facilitates a further connection to network 251 (e.g., the Internet).

POS system 211 can be at a physical store location along with additional POS systems including similar components. The physical store location may be owned by an entity, such as, for example, a retailer corporation that runs a chain of stores. The chain of stores can include one or more of: grocery stores, department stores, warehouse stores, discount stores, etc. In some embodiments, POS system 211 includes components in a checkout isle as well as components in a store based data center. Other POS systems, also including similar components, can be at other physical store locations owned by the entity.

Receipt data server 221 includes currency conversion module 223, Web server 241, communication module 242, and database access module 263. Web server 241 is configured to communicate with external devices, such as, for example, mobile device 201. A common entity, such as, a retailer corporation, can own one or more physical store locations (e.g., a chain of stores) as well as receipt data server 221. Each of the one or more store physical locations can include one or more POS systems as well as other computer systems (e.g., local backend servers). Communication module 242 can be configured to communicate with POS systems as well as other computer systems at each of the one or more physical store locations (e.g., on an internal corporate network) to facilitate business operations for the entity.

Receipt data server 221 can receive application identifiers and digital receipt data from POS systems at various different store locations, including POS system 211. Receipt data server 221 can formulate digital receipts from received receipt data. Formulated digital receipts can include entries for items included in corresponding digital receipt data (but potentially in a different format, for example, a format deliverable to mobile devices). Database access module 263 can store digital receipts along with application identifiers in receipt database 222. The application identifiers map digital receipts to corresponding mobile devices. Application identifiers can be indicated, either manually by a customer in an automated fashion by a mobile device, at the time of a transaction.

For example, receipt data server 221 can receive application ID 231 along with digital receipt data 261 from POS system 211. Receipt data server 221 can formulate digital receipt 233 from digital receipt data 261. Digital receipt 233 includes receipt entries for items 234A, 234B, 234C, etc. Receipt items 244A, 244B, 234C, etc. correspond to physical items purchased during a transaction at POS system 211 and can indicate an item price for each physical item. Digital receipt 233 can be stored along with application ID 231 to indicate that digital receipt 233 corresponds to mobile device 201.

In some embodiments, receipt data server 221 is part of a (e.g., regional, national, or global) backend system that receives receipt data from a plurality of POS systems distributed throughout different geographic locations and formulates corresponding digital receipts. The plurality of POS systems and the backend system can be part of a commonly owned and/or controlled corporate network infrastructure.

Subsequent to storing digital receipts, receipt data server 221 can send stored digital receipts to customer computing devices, such as, for example, smartphones and/or tablets. Receipt data server 221 can send digital receipts to a mobile device in response to a request and/or in accordance with configured settings. For example, in response to a request for receipts from mobile device 201, receipt data server 221 can send digital receipt 233 to mobile device 201. Sending digital receipts from receipt data server 221 to a mobile device can involve push or polled mechanisms. Receipt data server 221 can send digital receipts in a web or native view.

When appropriate, currency conversion module 223 can approximate financial data indicated in one currency into another currency. Approximating financial data can include converting financial data in a digital receipt (e.g., item prices, sub-totals, totals, taxes, discounts, refunds, etc.) from one currency to another currency. Currency conversion module 223 can be configured to approximate financial data in virtually any currency type based on the same financial data indicated in virtually any other currency type, including but not limited to currencies identified in the International Organization for Standardization published list of standard currency codes referred to as the ISO 4217 code list. Embodiments of the invention are equally applicable to: currencies that are in circulation, currencies that are not currently in (but that may return to) circulation (e.g., obsolete and old Euro-zone currencies, such as, Greek drachma), currencies that are not recognized by the ISO, currencies that are not per se an independent currency but a variant of (e.g., pegged to) another currency, currencies that are legal tender only issued as commemorative banknotes or coinage, or currencies that are from an unrecognized or partially recognized state.

Conversion server 271 includes currency conversion module 272. Conversion server 271 can be commonly owned along with POS system 211 and receipt data server 221. Alternately, conversion server 271 can be owned by a $3^{rd}$ party. Conversion module 272 can be specifically configured to approximate financial data in one currency type based on the same financial data indicated in another currency type. Currency conversion module 272 can be configured to convert financial data from and/or to virtually any currency types, including but not limited to the previously described currencies. In some embodiments, receipt data server 221 refers to conversion server 271 to have financial data (e.g., item prices) converted from one currency to another.

Currency rate server 284 can track exchange rates between different currencies. Given a currency pair, currency rate server 284 can return an exchange rate that can be used to convert between the currencies. In some embodiments, receipt data server refers 221 to currency rate server 284 to obtain an exchange rate for converting financial data (e.g., item prices) from one currency to another.

When appropriate, receipt data server 221 can store receipts with currency equivalent approximations as well as obtained exchange rates. Stored digital receipts with currency equivalent approximations and/or exchange rates can be used to keep an historical log for future use. The historical log can be useful for insuring that currency conversions are more accurate with respect to the time a digital receipt was generated. Financial data is more accurately converted when using an exchange rate that was correct close to the time the financial data was generated. Thus, when approximating currency equivalents, receipt data server 221 can refer to the historical log to identify an exchange rate that was correct on or near the time (e.g., the same day) the digital receipt was generated.

Mobile device 201 (e.g., a smartphone) includes communication module 203, display 204, and receipt management module 206. Generally, receipt management module 206 is configured to manage receipt data for a user of mobile device 201. Receipt management module 206 can be used to perform receipt related operations, such as, for example, sorting receipt data, searching receipt data, itemizing receipt data, approximating currency equivalents (e.g., for item prices), etc. in response to user-entered commands. Receipt management module 206 is also associated with application ID 231. Application ID 231 can be a unique ID used to distinguish receipt management module 206 (and thus also mobile device 201) from other receipt management modules (and thus also from other mobile devices). Application ID 231 can be assigned to mobile device 201 or derived from user related information, such as, for example, a telephone number, a loyalty card number, etc.

Receipt management module 206 can present user-interface 219 at display 204 (e.g., a general purpose display device). User-interface 206 can include (e.g., touch screen) user-interface controls allowing a user to select currency settings. Selected currency settings can be stored in currency settings 232. Selected currency settings can be used by receipt management module 206 to request that financial data in digital receipts be indicated in a specified currency. For example, customer 291 can enter input 292 to request digital receipts with financial data (e.g., item prices) indicated in a specified currency, such as, United States Dollar, Australian Dollar, Canadian Dollar, Japan Yen, Korea (South) Won, India Rupee, Taiwan New Dollar, Swiss Franc, etc. Thus, a user request for digital receipts with financial data in a specified currency can be accomplished by selecting currency settings through user interface 219.

In some embodiments, portions of currency settings 232 can be stored in receipt delivery preferences (possibly along with other receipt preferences) at receipt data server 221. At receipt data server 221, the receipt delivery preferences can be associated with application ID 231 to indicate that the receipt delivery preferences apply to mobile device 201. As such, receipt data server 221 can refer to stored portions of currency settings 232 when a request for digital receipts is received from mobile device 201.

Accordingly, when appropriate and in response to accessed currency settings (either stored at receipt data server 221 or included in a receipt request), receipt data server 221 can approximate currency equivalents for financial data (e.g., item prices) in a digital receipt.

Communication module 203 can be a wireless network adapter for connecting mobile device 201 with a wireless network, such as, for example, Wi-Fi and/or a cellular network (e.g., CDMA, GSM, iDen, etc.) that facilitates a further connection to network 251 (e.g., the Internet).

Figure 3:
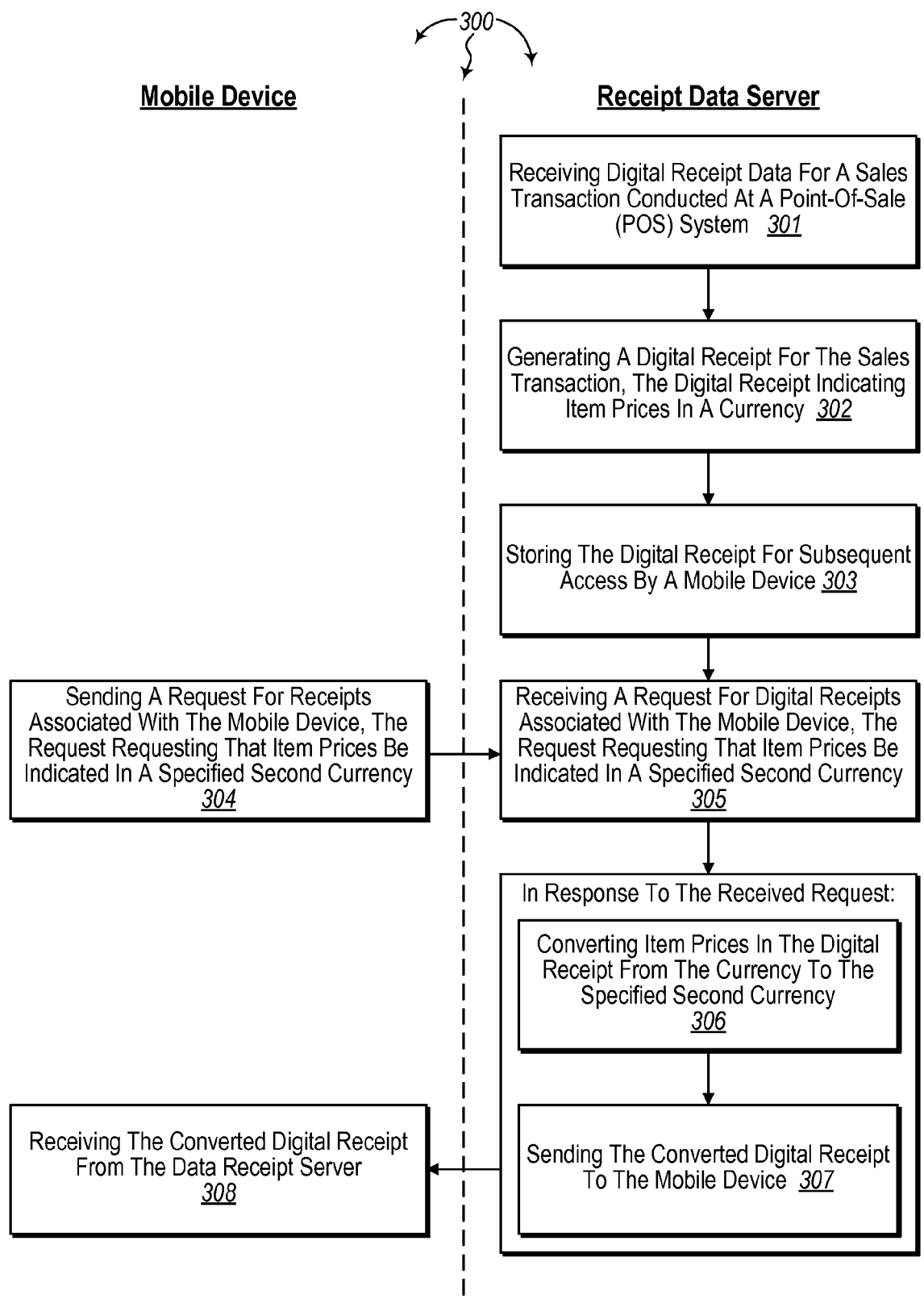
FIG. 3 illustrates a flow chart of an example method for approximating alternate currency equivalents in digital receipts.

FIG. 3 illustrates a flow chart of an example method 300 for approximating alternate currency equivalents in digital receipts. Method 300 will be described with respect to the components and data of computer architecture 200.

Method 300 includes receiving digital receipt data for a sales transaction conducted at a Point-Of-Sale (POS) system (301). For example, receipt data server 221 can receive application ID 231 and digital receipt data 261 from POS system 211. Digital receipt data 261 can correspond to a sales transaction conducted at POS system 211. Digital receipt data 261 can be received along with application ID 231 to indicate that digital receipt data 261 corresponds to mobile device 201. Digital receipt data 261 can include a receipt entry for each of one or more items purchased by a customer in the sales transaction. Each receipt entry can indicate an item price in a currency used at the store location.

Method 300 includes generating a digital receipt for the sales transaction, the digital receipt indicating item prices in a currency (302). For example, receipt data server 221 can process digital receipt data 261 to generate digital receipt 233 for the sales transaction at POS system 211. In some embodiments, financial data in digital receipt 233 is indicated in a default currency based on the geographic location of POS system 211. For example, if POS system 211 is physically located in the United States, receipt data server 221 can indicate financial data in digital receipt 233 in United States Dollars. In other embodiments, data receipt server 221 refers to stored currency settings to determine a user-specified currency for financial data in a digital receipt. For example, customer 291 may have selected Japanese Yen for a currency. The selection of Japanese Yen can be stored at receipt data server 221. Thus, receipt data server 221 can (possibly using an initial currency conversion) indicate financial data in digital receipt 233 in Japanese Yen.

Method 300 includes storing the digital receipt for subsequent access by a mobile device (303). For example, database access module 263 can store digital receipt 233 along with application ID 231 in receipt database 222. Financial data in digital receipt 233 can be indicated in a default currency based on geographic location or in a user-specified currency.

Method 300 includes sending a request for receipts associated with the mobile device, the request requesting that item prices be indicated in a specified second currency (304). For example, mobile device 201 can send request 239, containing application ID 231, to receipt data server 221. Request 239 requests any digital receipts associated with mobile device 201. In some embodiments, request 239 expressly requests that financial data in digital receipts be returned to mobile device 201 in a currency other than the currency in which the digital receipts are stored.

Method 300 includes receiving a request from a mobile device for digital receipts associated with the mobile device, the request requesting that item prices be indicated in a specified second currency (305). For example, receipt data server 221 can receive request 239, containing application ID 231, from mobile device 201. As described, in some embodiments, request 239 expressly requests that financial data be returned to mobile device 201 in a currency other than the currency in which the digital receipts are stored. In other embodiments, receipt data server 221 refers to stored receipt data preferences for mobile device 201 to determine a currency to use when returning digital receipts to mobile device 201. Either from an express indication in request 239 or by reference to previously configured receipt preferences for mobile device 201, receipt data server 221 can determine that financial data in digital receipt 233 is to be converted to a currency other than the currency in which digital receipt 233 is stored.

Method 300 includes in response to the received request, converting item prices in the digital receipt from the currency to the specified second currency (306). For example, in response to request 239, receipt data server 221 can handle converting financial data in digital receipt 233 from one currency to another currency. In some embodiments, currency conversion module 223 converts financial data in digital receipt 233 (e.g., in European Union Euros) to financial data in converted digital receipt 233C (e.g., in Swiss Francs). In other embodiments, receipt data server 221 sends digital receipt 233 to conversion server 271. In these other embodiments, currency conversion module 272 converts digital receipt 233 into converted digital receipt 233C. Conversion server 271 can then return converted digital receipt 233C back to receipt data server 221. Alternately or in combination, conversion server 271 can also return converted digital receipt 233C to mobile device 201.

Approximating currency equivalent financial data in a digital receipt can include converting item prices within the digital receipt from the currency to the specified second currency. For example, data receipt server 221 can handle converting items 234A, 234B, and 234C, etc. (e.g., in United States Dollars) to items 234AC, 234BC, 234CC, etc. (e.g., in Canadian Dollars) respectively.

When appropriate, receipt data server 221 and/or conversion server 271 can refer to currency rate server 284 to obtain an exchange rate between the currency and the specified second currency. For example, receipt data server 221 can send currency 281 (e.g., the currency) and currency 282 (e.g., the specified second currency) to currency rate server 284. Currency rate server 284 can determine that exchange rate 283 exists between currency 281 and currency 282. Currency rate server 284 can return exchange rate 283 back to receipt data server 221.

One or more of receipt data server 221, conversion server 271, and currency rate server 284 can have (at least a periodic) connection to the foreign exchange ("FX") market. Thus, one or more of receipt data server 221, conversion server 271, and currency rate server 284 can, at least form time to time, refer to the FX market to obtain the relative values of different currencies (i.e., exchange rates).

Method 300 includes, also in response to the received request, sending the converted digital receipt to the mobile device (307). For example, receipt data server 221 can send converted digital receipt 233C to mobile device 201.

In some embodiments, receipt data server 221 stores converted digital receipt 233C for subsequent access.

Method 300 includes receiving the converted digital receipt from the receipt data server (308). For example, mobile device 201 can receive converted digital receipt 233C from receipt data server 221. Alternately or in combination, mobile device 201 can receive converted digital receipt 233C from conversion server 271. Receipt management module 206 can present converted digital receipt 233C at user interface 219.

A mobile device can store digital receipts locally that indicate financial data in multiple different currencies, including an original currency as well as one or more conversions. When a digital receipt is stored in multiple different currencies, users can switch between various currencies of the digital receipt more efficiently. For example, mobile device 201 can store digital receipt 233 and digital receipt 233C locally. Thus, if a switch from digital receipt 233 to digital receipt 233C or vice versa is requested, the switch can be implemented more efficiently.

In some embodiments, a message can be appended to a digital receipt that has had financial data converted between currencies so as to provide information related to the currency conversion. An appended message can indicate that the indicated currency conversion includes currency equivalent approximations and is provided as a convenience and that the digital receipt in the original currency is valid for tax purposes. For example, a message can be appended to digital receipt 233C. The message can indicate that digital receipt 233C includes currency equivalent approximations and is provided as a convenience and that the digital receipt 233 is valid for tax purposes.

In some embodiments, currency/locale settings of a mobile device can be used to offer a currency conversion feature. For example, when it is detected that a mobile device is in a location that uses a currency different from a selected currency in currency/locale settings, the mobile device can activate and/or turn on a currency conversion feature. When using the currency conversion feature, a digital receipt can be provided to the mobile device in the original currency (i.e., the currency used at the location). The financial data in the digital receipt can also be converted from the original currency into the selected currency and provided to the mobile device in the selected currency. For example, when a currency conversion feature is active at mobile device 201, both digital receipt 233 and converted digital receipt 233C can be provided to mobile device 201. Thus, as described, when a switch from digital receipt 233 to digital receipt 233C or vice versa is requested, the switch can be implemented more efficiently.

Figure 4:
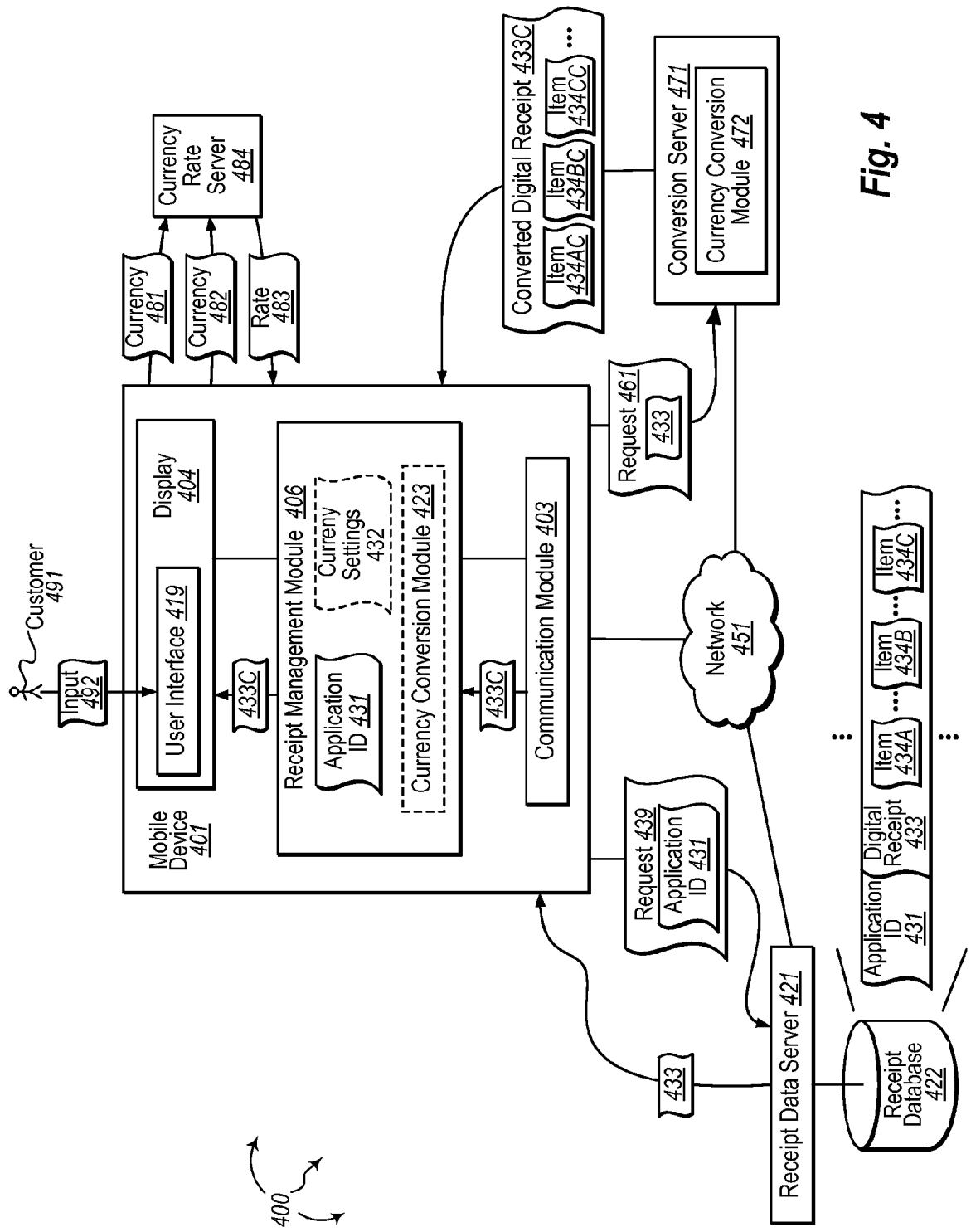
FIG. 4 illustrates another computer architecture that facilitates approximating alternate currency equivalents in digital receipts.

FIG. 4 illustrates another computer architecture 400 that facilitates approximating alternate currency equivalents in digital receipts. Referring to FIG. 4, computer architecture 400 includes mobile device 401, receipt data server 421, conversion server 471, and currency rate server 484. Each of the depicted systems, servers, and devices as well as their respective components can be connected to one another over (or be part of) network 451, such as, for example, a PAN, a LAN, a WAN, and even the Internet. Accordingly, each of the depicted components as well as any other connected computer systems and their components, can create message related data and exchange message related data (e.g., near field communications (NFC) payloads, Bluetooth packets, Internet Protocol (IP) datagrams and other higher layer protocols that utilize IP datagrams, such as, Transmission Control Protocol (TCP), Hypertext Transfer Protocol (HTTP), Simple Mail Transfer Protocol (SMTP), etc.) over the network.

Receipt data server 421 can be configured similarly receipt data server 221. For example, receipt data server 421 can include a Web server, a communication module, and a database access module. As such, receipt data server 421 can receive receipt digital receipt data from POS systems (e.g., at one or more physical store locations) and formulate corresponding digital receipts. Receipt data server can store formulated digital receipts along with application IDs in receipt database 422. For example, receipt data server 421 can formulate digital receipt 433 including items 434A, 434B, 434C, etc. Receipt data server 421 can store digital receipt 433 along with application ID 431 in receipt database 422.

In some embodiments, receipt data server 421 is part of a (e.g., regional, national, or global) backend system that receives receipt data from a plurality of POS systems distributed throughout different geographic locations and formulates corresponding digital receipts. The plurality of POS systems and the backend system can be part of a commonly owned and/or controlled corporate network infrastructure.

Subsequent to storing digital receipts, receipt data server 421 can send stored digital receipts to customer computing devices, such as, for example, smartphones and/or tablets. Receipt data server 421 can send digital receipts to a mobile device in response to a request and/or in accordance with configured settings. For example, in response to a request for receipts from mobile device 401, receipt data server 421 can send digital receipt 433 to mobile device 401. Sending digital receipts from receipt data server 421 to a mobile device can involve push or polled mechanisms. Receipt data server 421 can send digital receipts in a web or native view.

Mobile device 401 (e.g., a smartphone) includes communication module 403, display 404, and receipt management module 406. Generally, receipt management module 406 is configured to manage receipt data for a user of mobile device 401. Receipt management module 406 can be used to perform receipt related operations, such as, for example, sorting receipt data, searching receipt data, itemizing receipt data, approximating currency equivalents, etc. in response to user-entered commands. Receipt management module 406 is also associated with application ID 431. Application ID 431 can be a unique ID used to distinguish receipt management module 406 (and thus also mobile device 401) from other receipt management modules (and thus also from other mobile devices). Application ID 431 can be assigned to mobile device 401 or derived from user related information, such as, for example, a telephone number, a loyalty card number, etc.

Receipt management module 406 can present user-interface 419 at display 404 (e.g., a general purpose display device). User-interface 406 can include (e.g., touch screen) user-interface controls allowing a user to select currency settings. Selected currency settings can be stored in currency settings 432. Selected currency settings can be used by receipt management module 406 to request that financial data in digital receipts be indicated in a specified currency. For example, customer 491 can enter input 492 to request digital receipts with financial data (e.g., item prices) indicated in a specified currency, such as, United States Dollar, Australian Dollar, Canadian Dollar, Japan Yen, Korea (South) Won, India Rupee, Taiwan New Dollar, Swiss Franc, etc. Thus, a user request for digital receipts with financial data in a specified currency can be accomplished by selecting currency settings through user interface 419.

Accordingly, when appropriate and in response to accessed currency settings (either stored at receipt data server 421 or included in a receipt request), mobile device 401 can handle approximating currency equivalents by converting financial data (e.g., item prices) in a digital receipt from one currency to another currency.

Communication module 403 can be a wireless network adapter for connecting mobile device 401 with a wireless network, such as, for example, Wi-Fi and/or a cellular network (e.g., CDMA, GSM, iDen, etc.) that facilitates a further connection to network 451 (e.g., the Internet).

When appropriate, currency conversion module 423 can approximate financial data indicated in one currency into another currency. Approximating currency equivalents can be include converting financial data in a digital receipt (e.g., item prices, sub-totals, totals, taxes, discounts, etc.) from one currency to another currency. Currency conversion module 423 can be configured to approximate financial data in virtually any currency type based on the same financial data indicated in virtually any other currency type, including but not limited to currencies identified in the International Organization for Standardization published list of standard currency codes referred to as the ISO 4217 code list. Embodiments of the invention are equally applicable to: currencies that are in circulation, currencies that are not currently in (but that may return to) circulation (e.g., obsolete and old Euro-zone currencies, such as, Greek drachma), currencies that are not recognized by the ISO, currencies that are not per se an independent currency but a variant of (e.g., pegged to) another currency, currencies that are legal tender only issued as commemorative banknotes or coinage, or currencies that are from an unrecognized or partially recognized state.

Conversion server 471 includes currency conversion module 472. Conversion server 471 can be commonly owned along with POS system 411 and receipt data server 421. Alternately, conversion server 471 can be owned by a $3^{rd}$ party. Conversion module 472 can be specifically configured to approximate financial data in one currency type based on the same financial data indicated in another currency type. Currency conversion module 472 can be configured to convert financial data from and/or to virtually any currency types, including but not limited to the previously described currencies. In some embodiments, receipt data server 421 refers to conversion server 471 to have financial data (e.g., item prices) converted from one currency to another.

Currency rate server 484 can track exchange rates between different currencies. Given a currency pair, currency rate server 484 can return an exchange rate that can be used to convert between the currencies. In some embodiments, receipt data server 421 refers to currency rate server 484 to obtain an exchange rate for converting financial data (e.g., item prices) from one currency to another.

When appropriate, receipt data server 421 can store receipts with currency equivalent approximations as well as obtained exchange rates. Stored digital receipts with currency equivalent approximations and/or exchange rates can be used to keep an historical log for future use. The historical log can be useful for insuring that currency conversions are more accurate with respect to the time a digital receipt was generated. Financial data is more accurately converted when using an exchange rate that was correct close to the time the financial data was generated. Thus, when approximating currency equivalents, receipt data server 421 can refer to the historical log to identify an exchange rate that was correct on or near the time (e.g., the same day) the digital receipt was generated.

Figure 5:
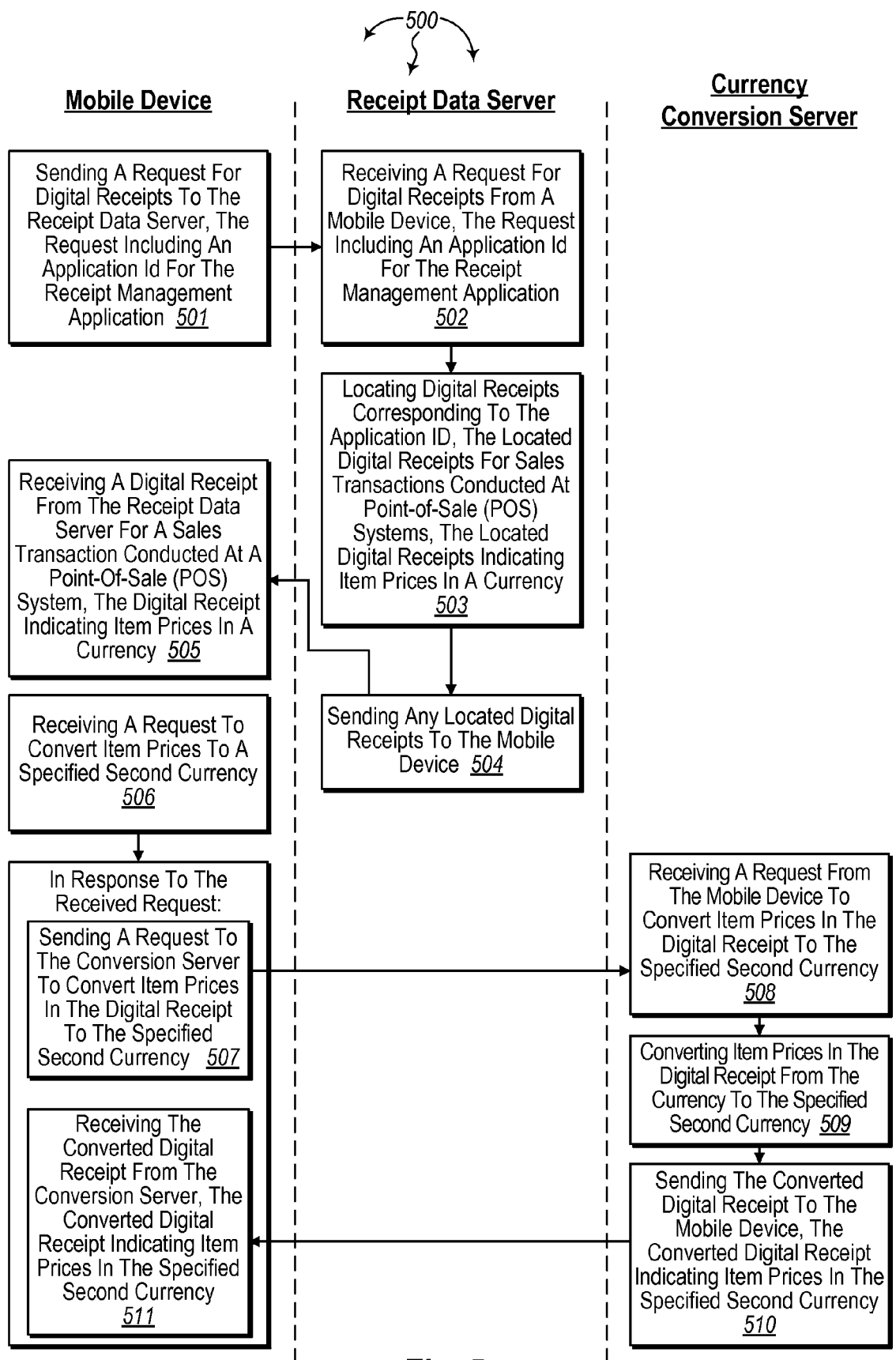
FIG. 5 illustrates another flow chart of an example method for approximating alternate currency equivalents in digital receipts.

FIG. 5 illustrates a flow chart of an example method 500 for approximating alternate currency equivalents in digital receipts. Method 500 will be described with respect to the components and data of computer architecture 400.

Method 500 includes sending a request for digital receipts to the receipt data server, the request including an application id for the receipt management application (501). For example, mobile device 401 can send request 439, containing application ID 431, to receipt data server 421. Request 439 requests any digital receipts associated with mobile device 401. Method 500 includes receiving a request for digital receipts from a mobile device, the request including an application ID for the receipt management application (502). For example, receipt data server 421 can receive request 439 from mobile device 401.

Method 500 includes locating any digital receipts corresponding to the application ID, the located digital receipts for sales transactions conducted at Point-Of-Sale (POS) systems, the located digital receipts indicating item prices in a currency (503). For example, receipt data server 421 can locate digital receipt 433 corresponding to application ID 431. Digital receipt 433 can be for a sales transaction conducted at POS system by a user of mobile device 401. In some embodiments, financial data in digital receipt 433 is stored in a default currency based on the geographic location of a POS system where the sales transaction was conducted. For example, if the POS system is physically located in Mexico, receipt data server 421 can indicate financial data in digital receipt 433 in Mexican Pesos. In other embodiments, data receipt server 421 refers to stored currency settings to determine a user-specified currency for a digital receipt. For example, customer 491 may have selected Canadian dollars for a currency. The selection of Canadian dollars can be stored at receipt data server 421. Thus, receipt data server 421 can store financial data (e.g., item prices) within digital receipt 433 in Canadian dollars.

Method 500 includes sending any located digital receipts to the mobile device (504). For example, receipt data server 421 can send digital receipt 433 to mobile device 401. Method 500 includes receiving a digital receipt from a receipt data server for a sales transaction conducted at a Point-Of-Sale (POS) system, the digital receipt indicating item prices in a currency (505). For example, mobile device 401 can receive digital receipt 433 from receipt data server 421.

Method 500 includes receiving a request to convert item prices to a specified second currency (506). For example, receipt management application 406 can receive a request to convert financial data in digital receipt 433 into a different currency for customer 491. Customer 491 can submit input 492 at user interface 419. Input 492 can select a different currency for indicating financial data in digital receipt 433. User interface 419 can include user interface controls for selecting a currency for use in indicating financial data. Alternately, receipt management application 406 can refer to currency settings 432 to determine a different currency for indicating financial data.

Method 500 includes, in response to receiving the request, sending a request to the conversion server to convert item prices in the digital receipt to the specified second currency (507). For example, mobile device 401 can send request 461, containing digital receipt 433, to conversion server 471. Request 461 can indicate that financial data in digital receipt 433 is to be converted to the different currency. Method 500 includes receiving a request from the mobile device to convert item prices in the digital receipt to the specified second currency (508). For example, conversion server 471 can receive request 461, containing digital receipt 433, from mobile device 401.

Method 500 includes converting item prices in the digital receipt from the currency to the specified second currency (509). For example, currency conversion module can convert digital receipt 433 into converted digital receipt 433C. Converting digital receipt 433 can include converting financial data (e.g., item prices) in digital receipt 433 into a different currency. For example, currency conversion module 472 can handle converting items 434A, 434B, and 434C, etc. (e.g., in Australian dollars) to items 434AC, 434BC, 434CC, etc. (e.g., in United Kingdom pounds) respectively.

When appropriate, conversion server 471 can refer to currency rate server 484 to obtain an exchange rate between the currency and the specified second currency. For example, receipt data server 421 can send currency 481 (e.g., the currency) and currency 482 (e.g., the specified second currency) to currency rate server 484. Currency rate server 484 can determine that exchange rate 483 exists between currency 481 and currency 482. Currency rate server 484 can return exchange rate 483 back to receipt data server 421.

One or more of mobile device 401, conversion server 471, and currency rate server 484 can have (at least a periodic) connection to the foreign exchange ("FX") market. Thus, one or more of mobile device 401, conversion server 471, and currency rate server 484 can, at least form time to time, refer to the FX market to obtain the relative values of different currencies (i.e., exchange rates).

Method 500 includes sending the converted digital receipt to the mobile device, the converted digital receipt indicating item prices in the specified second currency (510). For example, conversion server 471 can send converted digital receipt 433C to mobile device 401. Method 500 includes, also in response to receiving the request, receiving the converted digital receipt from the conversion server, the converted digital receipt indicating item prices in the specified second currency (511). For example, network adapter 404 can receive converted digital receipt 433C from conversion server 471.

In some embodiments, currency conversion module 423 converts digital receipt 433 (e.g., in Japanese yen) to converted digital receipt 433C (e.g., in Swiss francs).

Converted digital receipt 433C can be presented on user interface 419 at display 404.

A mobile device can store digital receipts locally that indicate financial data in multiple different currencies, including an original currency as well as one or more conversions. When a digital receipt is stored in multiple different currencies, users can switch between various currencies of the digital receipt more efficiently. For example, mobile device 401 can store digital receipt 433 and digital receipt 433C locally. Thus, if a switch from digital receipt 433 to digital receipt 433C or vice versa is requested, the switch can be implemented more efficiently.

In some embodiments, a message can be appended to a digital receipt that has had financial data converted between currencies so as to provide information related to the currency conversion. An appended message can indicate that the indicated currency conversion includes currency equivalent approximations and is provided as a convenience and that the digital receipt in the original currency is valid for tax purposes. For example, a message can be appended to digital receipt 433C. The message can indicated that digital receipt 433C includes currency equivalent approximations and is provided as a convenience and that the digital receipt 433 is valid for tax purposes.

In some embodiments, currency/locale settings of a mobile device can be used to offer a currency conversion feature. For example, when it is detected that a mobile device is in a location that uses a currency different from a selected currency in currency/locale settings, the mobile device can activate and/or turn on a currency conversion feature. When using the currency conversion feature, a digital receipt can be provided to the mobile device in the original currency (i.e., the currency used at the location). The financial data in the digital receipt can also be converted from the original currency into the selected currency and provided to the mobile device in the selected currency. For example, when a currency conversion feature is active at mobile device 401, both digital receipt 433 and converted digital receipt 433C can be provided to mobile device 401. Thus, as described, when a switch from digital receipt 433 to digital receipt 433C or vice versa is requested, the switch can be implemented more efficiently.

Further, digital receipts can be presented in a receipt list summary and/or searched locally using different currencies as search criteria. For example, a user may desire to search stored receipts for receipts indicated in United States dollars.

FIG. 8 illustrates approximating an alternate currency equivalent in a digital receipt. As depicted, item prices, sub-total, tax, and total in digital receipt 801 are in United States Dollars. A conversion module (e.g., any of conversion modules 223, 272, 423, 472) can use exchange rate 821 to approximate currency equivalents in Japanese Yen. The currency equivalents for item prices, sub-total, tax, and total in Japanese Yen can be included in digital receipt 802. Digital receipt 802 can indicate that contained financial data is approximated.

Figure 6:
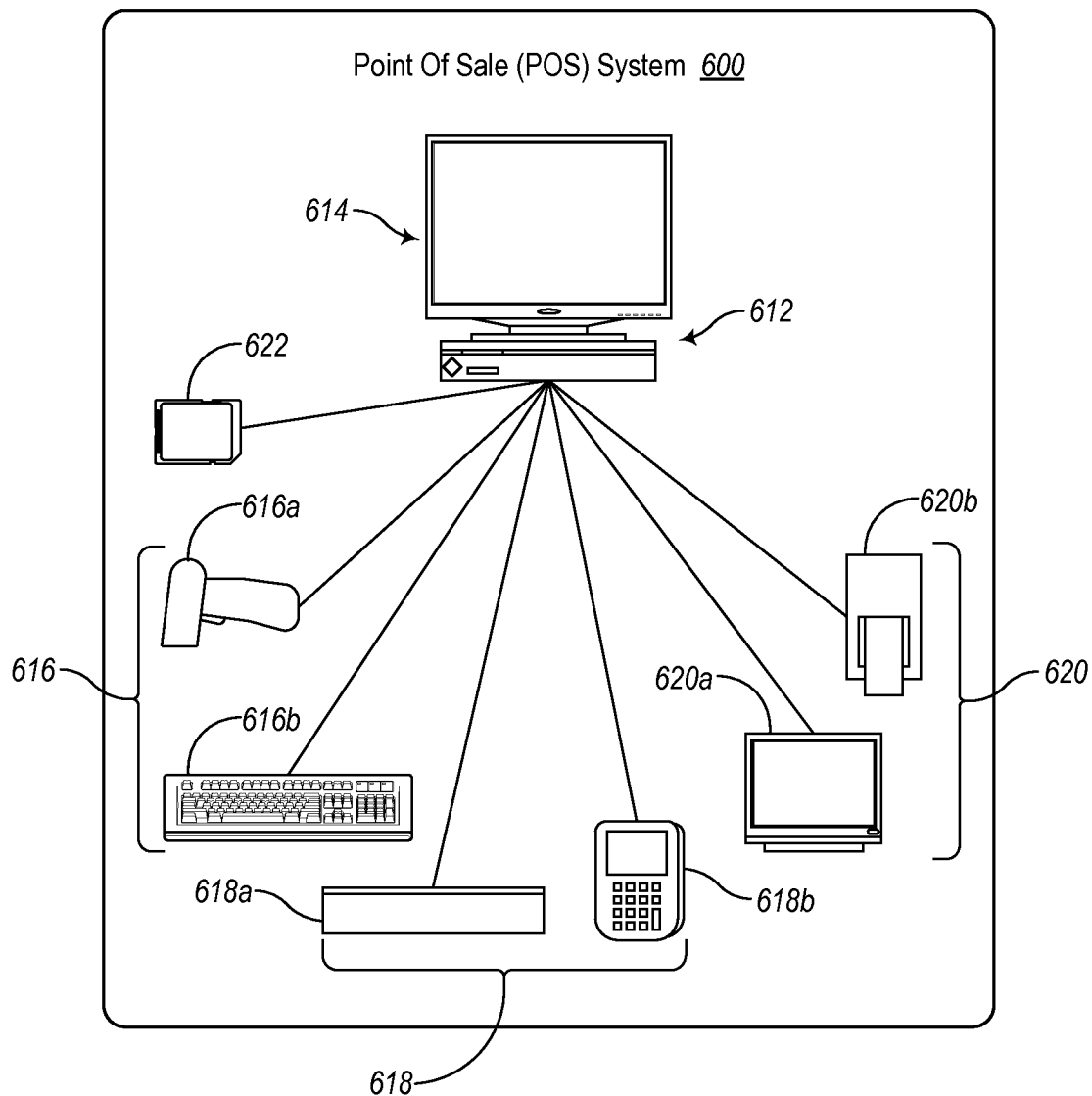
FIG. 6 illustrates an example schematic block diagram of a point-of-sale ("POS") system.

FIG. 6 illustrates an example schematic block diagram of a point-of-sale (POS) system 600. In some embodiments, the hardware, software, or hardware and software of POS system 600 may be configured to implement one or more methods in accordance with the present invention. For example, POS system 600 may be manufactured, programmed, modified, or upgraded to support transferring digital receipt data to mobile devices. POS system 211 can be a POS system similar to POS system 600.

POS system 600 can include various components. In some embodiments, POS system 600 includes a central or primary computer 612, a monitor 614 (e.g., a cashier-facing monitor 614), one or more input devices 616 (e.g., scanners 616a, keyboards 616b, scales, or the like), one or more payment devices 618 (e.g., cash drawers 618a, card readers 618b) for receiving or returning payments, one or more output devices 620 (e.g., customer-facing display 620a or monitor 620a, receipt printer 620b), or the like or combinations or sub-combinations thereof, and NFC module 622, such as, for example, an NFC dongle.

Computer 612 may form the backbone of POS system 610. Other components 616, 618, 620, 622 forming part of a POS system 610 can communicate with computer 612. Input devices 616 and certain payment devices 618 can feed data and commands to computer 612 for processing or implementation. For example, scanner 616a can pass data communicating the identity of one or more items to be purchased, returned, or the like to a computer 612. Similarly, card reader 618b can pass payment information to computer 612.

On the other hand, output devices 620 and certain payment devices 618 can follow or implement commands issued by computer 612. For example, cash drawer 618a may open in accordance with the commands of computer 612. Similarly, customer-facing display 620a and receipt printer 620b can display or output data or information as instructed by computer 612.

In some embodiments, in addition to handling consumer transactions (e.g., purchases, returns), POS system 600 can provide or support certain "back office" functionality. For example, POS system 600 can provide or support inventory control, purchasing, receiving and transferring products, or the like. POS system 600 can also store sales and customer information for reporting purposes, marketing purposes, receivables management, trend analysis, cost analysis, price analysis, profit analysis, or the like. If desired or necessary, POS system 1000 can include an accounting interface to pass certain information to one or more in-house or independent accounting applications.

Figure 7:
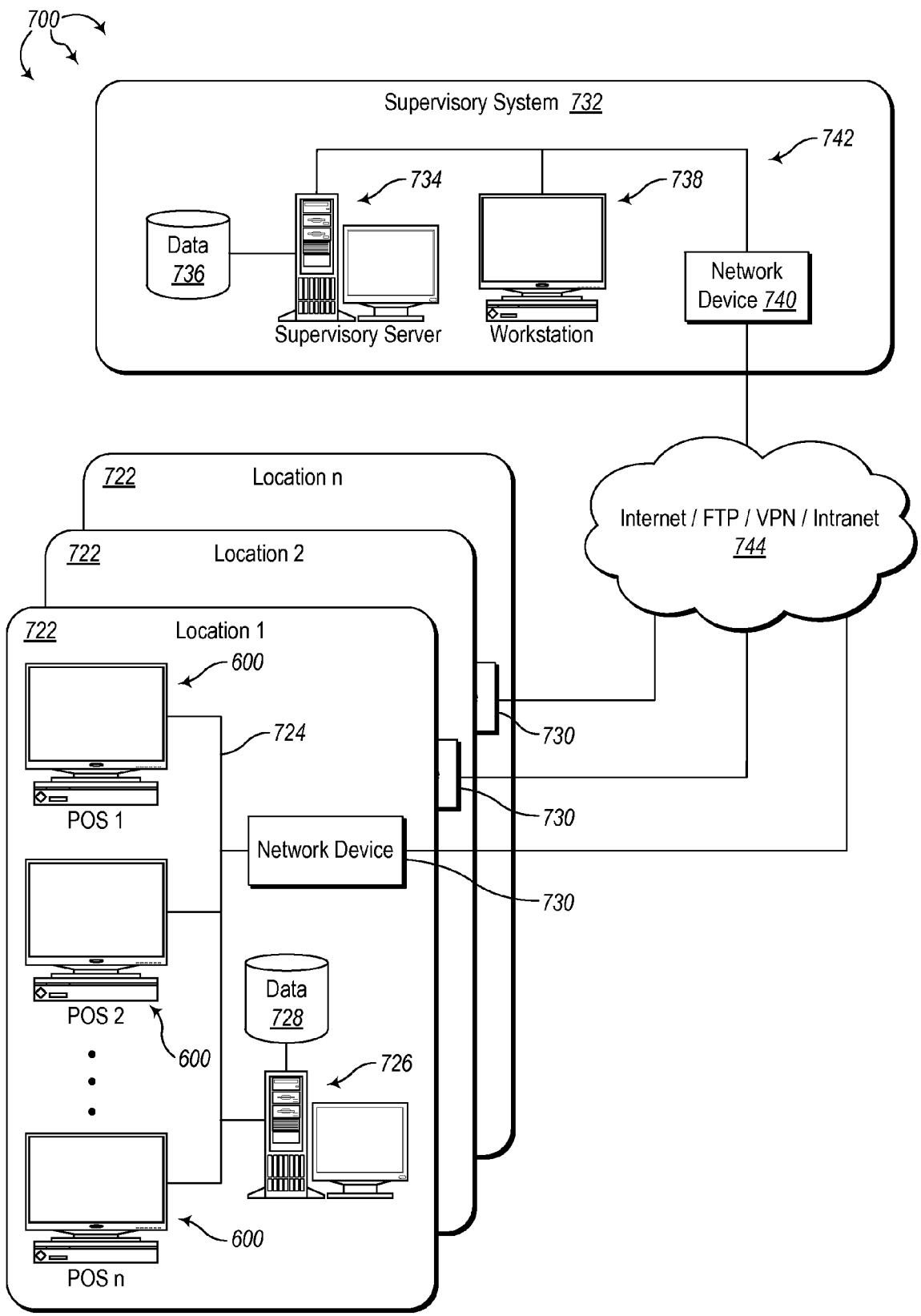
FIG. 7 illustrates an example schematic block diagram of a network of point-of-sale ("POS") systems.

In some embodiments, POS system 600 operates substantially independently, as a stand-alone unit. Alternately, POS system 600 may be one of several POS systems 600 forming the front line of a larger system. FIG. 7 illustrates an example schematic block diagram of a network 700 of point-of-sale (POS) systems 1000. For example, multiple POS systems 1000 may operate at a particular location 722 (e.g., within a retail, brick-and-mortar store). In such embodiments, the various POS systems 600 may be interconnected via LAN 724. LAN 724 may also connect the POS systems 700 to a local server 726.

Local server 726 can support the operation of the associated POS systems 600. For example, a server 726 may provide a central repository from which certain data needed by the associated POS systems 600 may be stored, indexed, accessed, or the like. Server 726 can serve certain software to one or more POS systems 600. In certain embodiments, a POS system 600 can offload certain tasks, computations, verifications, or the like to server 726.

Alternatively, or in addition thereto, server 726 can support certain back office functionality. For example, server 726 can receive and compile (e.g., within an associated database 728) data from the various associated POS systems 600 to provide or support inventory control, purchasing, receiving and transferring products, or the like. Server 726 can also receive and compile sales and customer information for reporting purposes, marketing purposes, receivables management, trend analysis, cost analysis, price analysis, profit analysis, or the like.

In some embodiments, one or more POS systems 600 and/or servers 726 corresponding to a particular location 722 can communicate with or access one or more remote computers or resources via one or more network devices 730. For example, a network device 730 can enable a POS system 600 to contact outside resources and verify the payment credentials (e.g., credit card information) provided by a customer. A network device 730 can comprise a modem, router, or the like.

In selected embodiments, POS systems 600 operate within an enterprise-wide system 731 comprising multiple locations 722 (e.g., branches 722 or stores 722). In such embodiments, each location 722 may have one or more POS systems 600, local servers 726, local databases 728, network devices 730, or the like or combinations or sub-combinations thereof connected by a computer network (e.g., a LAN 724). Either of receipt data servers 221 and 421 can be included in and/or can include the functionality of a local server 726.

Additionally, each such location 722 may be configured to interact with one or more supervisory systems 732. For example, multiple branch locations 722 may report to an associated "headquarters" location or system. Either of receipt data servers 221 and 421 can be included in and/or can include the functionality of a supervisory system 732.

A supervisory system 732 can include one or more supervisory servers 734, databases 736, workstations 738, network devices 740, or the like or combinations or sub-combinations thereof. The various components of a supervisory system 732 can be interconnected via a computer network (e.g., a LAN 742). In selected embodiments, a supervisory system 732 includes one or more supervisory servers 734 providing a central repository from which certain data needed by the one or more POS systems 700 or local servers 726 may be stored, indexed, accessed, or the like.

Alternatively, or in addition thereto, a supervisory server 734 can receive and compile (e.g., within an associated database 736) data from the various associated POS systems 600 or local servers 726 to provide or support inventory control, purchasing, receiving and transferring products, or the like. A supervisory server 734 may also receive and compile sales and customer information for reporting purposes, marketing purposes, receivables management, trend analysis, cost analysis, price analysis, profit analysis, or the like.

A supervisory system 732 can be connected to one or more associated locations 722 or branches 722 in via any suitable computer network 744 (e.g., WAN 744). For example, in selected embodiments, one or more locations 722 can connect to a supervisor system 732 via the Internet. Communication over such a network 744 can follow any suitable protocol or security scheme. For example, communication may utilize the File Transfer Protocol (FTP), a virtual private network (VPN), intranet, or the like.

Although the components and modules illustrated herein are shown and described in a particular arrangement, the arrangement of components and modules may be altered to process data in a different manner. In other embodiments, one or more additional components or modules may be added to the described systems, and one or more components or modules may be removed from the described systems. Alternate embodiments may combine two or more of the described components or modules into a single component or module.

The foregoing description has been presented for the purposes of illustration and description. It is not intended to be exhaustive or to limit the invention to the precise form disclosed. Many modifications and variations are possible in light of the above teaching. Further, it should be noted that any or all of the aforementioned alternate embodiments may be used in any combination desired to form additional hybrid embodiments of the invention.

Further, although specific embodiments of the invention have been described and illustrated, the invention is not to be limited to the specific forms or arrangements of parts so described and illustrated. The scope of the invention is to be defined by the claims appended hereto, any future claims submitted here and in different applications, and their equivalents.

What is claimed:

1. At a receipt database server, the receipt database server including a processor and system memory, the receipt database server connected to a Point-Of-Sale (POS) systems for a merchant, the receipt database server configured to manage a receipt database containing receipts for any transactions between the merchant and a plurality of different customers, a method for providing a digital receipt in a different currency than the currency used when the digital receipt was originally generated, the method comprising the receipt database server:

receiving digital receipt data for a sales transaction conducted at the Point-Of-Sale (POS) system by a customer, the digital receipt data containing a receipt entry for each of one or more items purchased by the customer in the sales transaction and a date of the sales transaction, each receipt entry indicating an item price in a currency used at the Point-Of-Sale (POS) system during the sales transaction, the digital receipt data also including an application identifier referencing a receipt management module used by the customer, the application identifier having been provided by the customer during the sales transaction;

generating a digital receipt for the sales transaction from the digital receipt data, the digital receipt indicating item prices in the currency;

subsequent to completion of the sales transaction, storing the digital receipt along with the application identifier at the receipt database server with the item prices indicated in the currency;

subsequent to storing the digital receipt at the receipt database server with item prices indicated in the currency, receiving a request from a mobile device to present the digital receipt at the mobile device using a different second currency, the request including the application identifier and requesting that item prices be indicated in the different second currency when the digital receipt is presented at the mobile device, the application identifier having been entered by a user of the mobile device, the mobile device associated with the customer and separate from the Point-Of-Sale (POS) system, the user being different than the customer;

in response to the request, altering the functionality of the processor for converting the digital receipt into a converted digital receipt by:

subsequent to receiving the request from the mobile device, accessing the digital receipt from storage based on the application identifier;

referring to a historical currency exchange rate between the currency and the different second currency applicable as of the date of the sales transaction;

converting item prices in the digital receipt from the currency to the different second currency in accordance with the historical currency exchange rate; and sending the converted digital receipt to the receipt management module at the mobile device for presenting item prices in the specified second currency at the mobile device.

2. The method of claim 1, wherein receiving a request for the digital receipt comprises receiving a request from the receipt management application resident at the mobile device.

3. The method of claim 1, wherein receiving a request for the digital receipt comprises receiving a request for the digital receipt that expressly indicates that item prices are to be converted into the specified second currency.

4. The method of claim 1, further comprising, prior to receiving the request, receiving specified currency settings for the mobile device, the specified currency settings indicating that item prices are to be sent to the mobile device in the specified second currency.

5. The method of claim 4, further comprising referring to the specified currency settings for the mobile device to determine that the items prices are to be converted into the specified second currency.

6. The method of claim 1, wherein receiving the request for the digital receipt comprises receiving a request at a Web server.

7. The method of claim 1, wherein sending the converted digital receipt to the receipt management module from the Web server.

8. The method of claim 1, wherein converting item prices from the currency to the second different currency comprises a conversion module at the receipt database server converting item prices from the currency to the second specified currency.

9. The method of claim 1, wherein referring to a historical currency exchange rate comprises:

sending an indication of the currency, the second different currency, and the date to a currency rate server; and receiving the historical currency exchange rate back from the currency conversion server.

10. At a computer system, the computer system including one or more processors and system memory, a method for a digital receipt in a different currency that the currency used when the digital receipt was originally generated, the method comprising:

subsequent to completion of a sales transaction, storing a digital receipt for the sales transaction along with an application identifier, the digital receipt indicating item prices in a currency and a transaction date, the application identifier referencing a receipt management module used by the customer, the application identifier having been provided by the customer during the sales transaction;

subsequent to storing the digital receipt with item prices in the currency, receiving a request for the digital receipt from another device, the request requesting that item prices in the digital receipt be indicated in a different second currency when presented at the other device, the request including the application identifier, the application identifier having been entered by a user of the other device, the other device associated with the customer and separate from a Point-Of-Sale (POS) where the transaction occurred, the user different than the customer;

in response to the request:
 accessing the digital receipt from storage based on the application identifier; and
 the processor converting the digital receipt into a converted digital receipt to satisfy the request by:
  referring to a historical currency exchange rate between the currency and the different second currency applicable for the transaction date; and
  converting item prices in the previously stored digital receipt from the currency to the specified different second currency in accordance with the historical currency exchange rate; and
 sending the converted digital receipt to the receipt management module at the other device for presenting items prices in the different second currency at the other device.

11. The method of claim 10, wherein receiving a request for a previously stored digital receipt comprises receiving a request for a digital receipt resident at a receipt data server.

12. The method of claim 10, wherein receiving a request for a previously stored digital receipt comprises receiving a request for digital receipts that expressly indicates that item prices are to be indicated in the specified currency.

13. The method of claim 10, further comprising, prior to receiving the request, setting specified currency settings in a receipt management application resident at the computer system, the specified currency settings indicating item prices are to be indicated in the specified currency for viewing at the computer system.

14. The method of claim 13, further comprising referring to the specified currency settings in the receipt management application to determine that the item prices are to be converted to the specified currency.

15. The method of claim 10, wherein receiving a request for digital receipts comprises receiving a request.

16. The method of claim 10, wherein converting item prices in the previously stored digital receipt comprises a conversion module resident at the computer system converting item prices in the previously stored digital receipt.

17. The method of claim 10, wherein referring to a historical currency exchange rate comprises:
sending an indication of the specified currency, the different currency, and the transaction date to a currency rate server; and
receiving the historical currency exchange rate back from the currency conversion server.

18. The method of claim 10, wherein converting item prices in the previously stored digital receipt from the specified currency to a second different currency comprises:
sending the previously stored digital receipt along with an indication of the different second currency to a currency conversion server; and
receiving the converted digital receipt back from the currency conversion server.

19. A computer system for providing a digital receipt in a different currency than the currency used when the digital receipt was originally generated, the computer system comprising:
one or more processors;
system memory;
one or more computer storage media having stored thereon computer-executable instructions that, when executed, cause the computer system to:
 subsequent to completion of a sales transaction, store a digital receipt for the sales transaction along with an application identifier, the digital receipt indicating item prices in a currency and a transaction date, the application identifier referencing a receipt management module used by the customer, the application identifier having been provided by the customer during the sales transaction;
 subsequent to storing the digital receipt with item prices in the currency, receive a request for the digital receipt from another device, the request requesting that item prices in the digital receipt be indicated in a different second currency when presented at the other device, the request including the application identifier, the application identifier having been entered by a user of the other device, the other device associated with the customer and separate from a Point-Of-Sale (POS) where the transaction occurred, the user different than the customer;
 in response to the request:
  access the digital receipt from storage based on the application identifier; and
  convert the digital receipt into a converted digital receipt to satisfy the request by:
   refer to a historical currency exchange rate between the currency and the different second currency applicable for the transaction date; and
   convert item prices in the previously stored digital receipt from the currency to the different second currency in accordance with the historical currency exchange rate; and
  send the converted digital receipt to the receipt management module at the other device for presenting items prices in the specified different currency at the other device.

20. The system of claim 19, further comprising computer executable instructions that, when executed, cause the computer system to refer to currency settings to determine that item prices are to be indicated in the specified currency.

* * * * *